United States Patent
Wiggins et al.

(10) Patent No.: US 7,715,363 B1
(45) Date of Patent: May 11, 2010

(54) WIDE AREA NETWORK WITH A LARGE NUMBER OF ENDPOINTS AND A HIGH BANDWIDTH OPTICAL BACKBONE

(75) Inventors: Keith D. Wiggins, Charlotte, NC (US); Wayne B. Snyder, Charlotte, NC (US)

(73) Assignee: Sprint Communications Company L.P., Overland Park, KS (US)

(*) Notice: Subject to any disclaimer, the term of this patent is extended or adjusted under 35 U.S.C. 154(b) by 1708 days.

(21) Appl. No.: 10/384,814

(22) Filed: Mar. 10, 2003

(51) Int. Cl.
    *H04L 12/66* (2006.01)
(52) U.S. Cl. .................... 370/352; 370/223; 398/59
(58) Field of Classification Search ......... 379/352–354; 370/352–356
    See application file for complete search history.

(56) References Cited

U.S. PATENT DOCUMENTS

| | | | |
|---|---|---|---|
| 6,105,009 A * | 8/2000 | Cuervo | 705/43 |
| 6,430,201 B1 * | 8/2002 | Azizoglu et al. | 370/535 |
| 6,567,429 B1 * | 5/2003 | DeMartino | 370/539 |
| 6,701,088 B1 * | 3/2004 | Watanabe et al. | 398/51 |
| 6,898,205 B1 * | 5/2005 | Chaskar et al. | 370/450 |
| 7,133,905 B2 * | 11/2006 | Dilley et al. | 709/219 |
| 7,209,659 B2 * | 4/2007 | Munter | 398/49 |
| 2002/0191250 A1 * | 12/2002 | Graves et al. | 359/128 |
| 2003/0081540 A1 * | 5/2003 | Jones et al. | 370/217 |
| 2004/0105456 A1 * | 6/2004 | Lanzone et al. | 370/429 |

* cited by examiner

*Primary Examiner*—Simon Sing

(57) ABSTRACT

The present invention relates to the networking of a large number of endpoints using a high bandwidth optical backbone. The large number of endpoints, which may be thousands or more in number, connect through a local access telecommunications networks to points of presence. From each point of presence, the connection with the endpoints are routed directly to an optical node, which provides access to and from the high bandwidth optical backbone. No intermediate network layer is employed between the point of presence and the optical node, thereby reducing network complexity, increasing network stability, and eliminating limitations on bandwidth available to the endpoints imposed by an intermediate network layer and communications protocols employed therein.

5 Claims, 6 Drawing Sheets

WIDE AREA NETWORK WITH A LARGE NUMBER OF ENDPOINTS AND A HIGH BANDWIDTH OPTICAL BACKBONE

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to the field of telecommunications networking. More particularly, the present invention relates to the networking of a large number of endpoints within local access networks directly to a high bandwidth optical backbone of a wide area optical network.

BACKGROUND OF THE INVENTION

Telecommunications connectivity has become a critical resource for most enterprises in the United States and abroad. Whether such connectivity is used to transmit traditional voice telephone communications, facsimile transmissions, or data, most enterprises from large corporations to small non-profit groups require such connectivity to function on a daily basis.

To meet these connectivity needs, a wide variety of methods and devices have been developed. Often the best solution depends upon the size and nature of a given enterprise. A small business may effectively and efficiently meet its needs with a small number of telephone lines for voice calls, facsimile transmissions, and dial-up Internet access. A mid-sized enterprise such as a business, a school, or a local government facility may require a local area network ("LAN") with a high bandwidth data connection linking the LAN to external networks such as the Internet. A larger enterprise such as a large business or governmental agency with multiple sites may require a LAN at each site and high bandwidth data connections with appropriate hardware and software to connect the multiple LANs into a wide area network ("WAN"). Numerous methods and protocols exist for establishing LANs and WANs, each with its own unique attributes that may make it particularly useful in certain applications.

The challenge of maintaining adequate and reliable data connectivity becomes particularly pronounced when an enterprise has a large number of endpoints that must be connected. For example, national or regional banks face serious challenges to maintaining adequate data connectivity for their large number of endpoints. Such endpoints include, of course, bank locations. Endpoints also include locations such as a automated teller machines ("ATMs"), which may be located within bank locations or remotely from other bank facilities. Data connectivity at such endpoints must be sufficient to, at a minimum, securely verify account information for bank patrons accessing their account at that endpoint and to transmit information regarding the transaction to a central facility. Ideally, data connectivity to endpoints such as ATMs can be used to update endpoint systems, such as software, and to provide value added services such as real time account information, check images, financial information or entertainment functions such as games and streaming video.

While banks are a type of enterprise with a particular need to network a large number of endpoints, other types of enterprises face challenges in networking large numbers of endpoints include large retailers, package and letter delivery services, gasoline stations, and any other private of public enterprise with a large number of endpoints. Unfortunately, the present complexity and instability of networks with a large number of endpoints, as well as the limited bandwidth available to endpoints in such networks, limits their functionality.

The limitations upon data connectivity of networks with a large number of endpoints in the current state of the art derive in large part from the limitations of network communications protocols employed at the edge of such networks. In the current state of the art the endpoint is connected to a data network using a communications protocol. Often, physically proximate endpoints, such as ATM and bank locations in a particular metropolitan area use the local access telecommunications network to connect endpoints to an intermediate network employing a communications protocol such as frame relay. Data cannot travel to and from an endpoint at a rate in excess of the rate available using the communications protocol of the intermediate network. The intermediate network thus often creates a bottleneck for data flowing to or from an endpoint.

The inherent complexity of linking a multitude of networks also hinders the performance of networks with a large number of endpoints. In accordance with the prior art, each of the large number of endpoints connects to a local access network. The local access network connects to an intermediate network. The intermediate network layer connects to the wide area network, which often employs a high bandwidth optical backbone to transmit a high volume of signals over great distances. The provider of the local access network and the intermediate network may differ from one metropolitan area to another, or even in different sections of a single metropolitan area. Thus, endpoints in one metropolitan area may use an intermediate network provided by different service providers. An enterprise with endpoints across the United States can easily have endpoints connected via dozens, or even hundreds, of different intermediate networks. Within the broad range of United States telecommunications standards, each of these intermediate networks may have different system configurations and may possess varying bandwidth capabilities. This wide variety of intermediate networks, even if all are operating using common protocols and standards, creates a large challenge to connecting these multiple networks to form a larger network.

As one can easily imagine, the complexity of combining three layers of networks including dozens, and possibly many more, separate networks with varying hardware and network protocols to establish data connectivity between a large multitude of endpoints, creates numerous opportunities for failure and data slow downs. Depending upon specific configurations used, each local access network can require a multitude of switches and one or more routers to direct signals to and from the endpoint. The intermediate network also requires switches, routers, and other equipment to establish network protocols and to properly direct signals. The high bandwidth optical backbone must possess the ability to receive signals from the diverse number of access layer networks. Within each of the three networks, failures and transmission slow downs can occur. Also particularly susceptible to failures are the connections between the networks. Given that there can be dozens or even hundreds of local access networks and intermediate networks joined in such a system, one can easily see that the possibility of connection failure is high.

The complexity and fragility of present data connectivity systems for a large multitude of endpoints creates several limitations upon the types of services that can be performed over such system. Even the most rudimentary of services, such as accessing a central database to retrieve or input information, can be impeded or prevented entirely by failures in the system. The complexity can significantly impair the bandwidth available to endpoints, which slows data exchanges. The network complexity and bandwidth limitations also impairs the upgrading of software and services at the endpoints. For example, manually installing software upgrades at each endpoint can be prohibitively difficult when the endpoints number in the several thousand. Ideally, such upgrades could be installed using a "push" from a central source over the telecommunications network. However, faults in the complex telecommunications network described above can prevent all or part of such updates from arriving at all endpoints, and bandwidth restrictions in the intermediate networks can so slow the transmission of the update as to render its installation impractical. Other value added services, which could increase customer satisfaction and produce additional revenue streams for an enterprise, may not be available using a fault-prone and slow network. For example, the delivery of streaming video to endpoints, or the provision of real time data cannot realistically be achieved unless endpoint connectivity possess sufficient bandwidth and reliability to deliver such services.

The complexity of a wide area network involving a large multitude of endpoints also adds costs for an enterprise in terms of maintaining and upgrading the network. As with any endeavor, greater complexity leads to greater opportunity for failure and greater cost of maintenance. A simplified network, such as one that eliminated a network layer, would decrease the cost of maintenance and would also decrease the cost of access paid to telecommunications providers. The elimination of the intermediate network could also remove a significant limitation on the bandwidth available to the endpoints.

BRIEF SUMMARY OF THE INVENTION

The present invention relates to the efficient and stable networking of a large number of endpoints in wide spread geographical areas. Endpoints may be branch office locations or other points of access for users, such as automated teller machines. Endpoints are connected to a point of presence through the local access network within which they are located. From the point of presence, the signal with the endpoint is directly routed to an optical node. A high bandwidth optical backbone for the rapid transmission of a large volume of signals is accessed through the optical node. This configuration eliminates the intermediate network layer used in the prior art, thereby reducing costs, increasing network stability, and removing limitations on bandwidth available to endpoints. The present invention allows a telecommunications link with the endpoint, such as a T1, to be connected to the wide area optical network at substantially its full available bandwidth. A telecommunication network in accordance with the present invention eliminates the intermediate network, thereby effectively increasing the bandwidth available to the endpoint. Thus, the present method and system of establishing a wide area network with a large number of endpoints increases the bandwidth available to the endpoints while reducing complexity and cost of the network.

BRIEF DESCRIPTION OF THE SEVERAL VIEWS OF THE DRAWING

The present invention is described in detail below with reference to the attached drawing figures, where in.

DETAILED DESCRIPTION OF THE INVENTION

Figure 1:
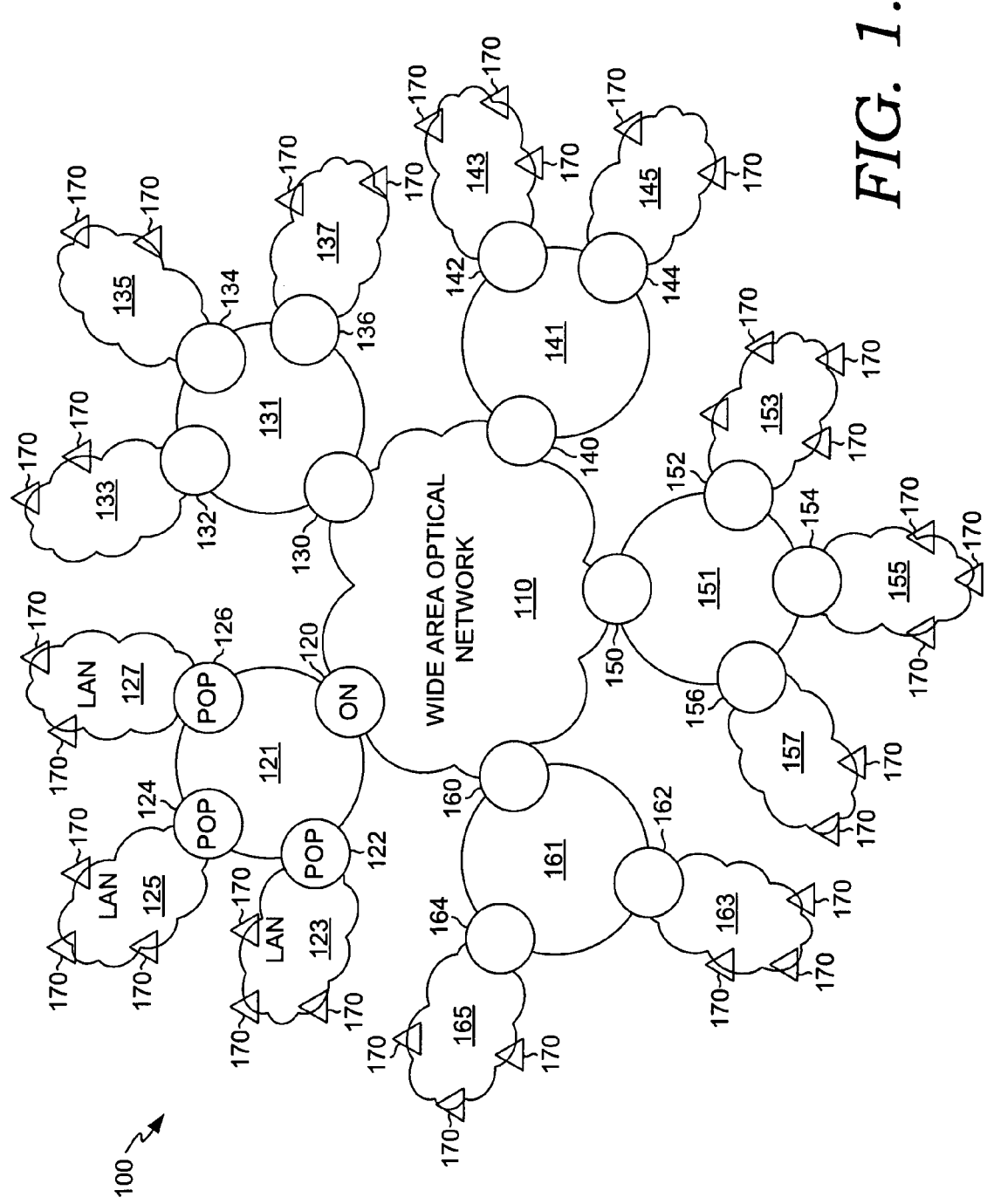
FIG. 1 schematically illustrates a network with a large number of endpoints in accordance with the present invention.

A system and method in accordance with the present invention may be implemented in a variety of forms. FIG. 1 schematically illustrates a telecommunications network 100 connecting endpoints 170 to a wide area optical network 110. The wide area optical network 110 is a high bandwidth optical backbone system that may be installed by the user of the network or, more typically, owned and maintained by a telecommunications company and accessed by the enterprise implementing the network. Each endpoint 170 represents a point at which enterprise employees or customers access and input information to the network 100. Endpoints 170 may be stores, branch offices, ATMs or other information kiosks, or any other point at which the enterprise's network is accessed. Endpoints 170 may also be of various types within a single network 100, for example, both ATMs and bank office locations. Multiple endpoints 170 may be physically located within a single physical location.

The present invention is particularly adapted for use with a large number of endpoints 170. The amount of endpoints 170 constituting a "large number" may vary for different enterprises, but may typically be assumed to be in the hundreds or thousands. While the invention may be practiced with a smaller number of endpoints 170, such as a mere plurality in the endpoints 170, the advantages of efficiency and stability in accordance with the present invention are more fully realized in comparison with other networks including hundreds or thousands of endpoints 170.

Each endpoint 170 is connected to a local access network. In FIG. 1, numerous local access networks are illustrated. Each local access network may be, for example, a telecommunications network for a local metropolitan area or a subset of a local metropolitan area. In broad concept, signals to and from each endpoint 170 are directed through a local access network to a point of presence, and from the point of presence the signals are routed to an optical node. A point of presence, often referred to in the art as a "POP" or a "pop", is a facility allowing a signal to access a telecommunication service provider's network facilities. An optical node is a facility allowing signals to enter and leave the high bandwidth optical backbone that comprises the wide area optical network 110. Signals may be routed from the point of presence to an optical node over a telecommunications connection media, such as a metropolitan area network ring, which typically comprises a high bandwidth optical fiber ring in a metropolitan area. While metropolitan area network rings are illustrated in FIG. 1 as being used to connect local access networks to optical nodes, other connection media, methods and systems may be used.

In FIG. 1, a plurality of endpoints 170 connect to point of presence 122 through the local access network 123. From the point of presence 122, signals to and from the endpoints 170 are routed to optical node 120 via telecommunication ring 121. A plurality of endpoints 170 access point of presence 124 through the local access network 125. Likewise, a plurality of endpoints 170 access point of presence 126 through local access network 127. Point of presence 124 and point of presence 126 route signals to and from endpoints 170 directly to optical node 120 via telecommunication ring 121.

Similarly, a plurality of endpoints 170 connect to point of presence 132 through local access network 133. A plurality of endpoints 170 connect to point of presence 134 through local access network 135. Another plurality of endpoints 170 connect to point of presence 136 through local access network 137. Point of presence 132, point of presence 134, and point of presence 136 route signals to and from the endpoints 170 directly to optical node 130 via telecommunications ring 131.

In a similar fashion, a plurality of endpoints 170 connect to point of presence 142 through local access network 143. A plurality of endpoints 170 connect to point of presence 144 through local access network 145. Point of presence 142 and point of presence 144 route signals to and from the end points 170 directly to optical node 140 via telecommunication ring 141.

Similarly, a plurality of endpoints 170 connect to point of presence 152 through local access network 153. A plurality of endpoints 170 connect to point of presence 150 through local access network 155. A plurality of endpoints 170 connect to point of presence 156 through local access network 157. Point of presence 152, point of presence 154, and point of presence 156 route signals to and from the plurality of endpoints 170 directly to optical node 150 via telecommunication ring 151.

In a similar fashion, local access network 163 includes a plurality of endpoints 170 that connect to point of presence 162 through local access network 163. Local access network 165 includes a plurality of endpoints 170 that connect to point of presence 164 through local access network 165. Point of presence 162 and point of presence 164 directly route signals to and from endpoints 170 to optical node 160 via telecommunications ring 161.

Optical node 120, optical node 130, optical node 140, optical node 150, and optical node 160 access the high bandwidth optical backbone that comprises the wide area optical network 110. Each optical node may aggregate signals received from the plurality of endpoints 170 accessing the wide area optical network 110 through that node. Likewise, each optical node may separate signals received from the wide area optical network 110 directed to a particular optical node 170. Wide area optical network 110 allows for the rapid transmission of high volumes of data over large geographical distances. The wide area optical network 110 may connect to one or more central offices. Central offices may connect to the wide area optical network 110 through an optical node that is also used by points of presence to connect to the wide area optical network or through a dedicated optical node. A central office may store information to be accessed and updated by endpoints, such as account information or shipment tracking information. A central office may also originate software installations to endpoints and may originate other value added services, such as images, real time data, or streaming video. Within the United States and abroad, a variety of telecommunication companies provide access to their wide area optical networks for a variety of purposes as part of their ongoing businesses. Of course, an enterprise wishing to utilize the present invention could construct a wide area optical network for its own use, but such construction would be less economical than paying to access an existing wide area optical network in the present business setting.

In reference to FIG. 1, it should be noted that the points of presence connect the local access networks directly to optical nodes without an intermediate network. The omission of intermediate networks reduces complexity and potential for failure while increasing the bandwidth available to the endpoints 170 by eliminating bandwidth limitations of the intermediate networks.

In further reference to FIG. 1, it should be realized that the schematic illustration therein is illustrative only. In actual application, the number of endpoints 170 can, and likely will, greatly exceed the number illustrated in FIG. 1. The number of endpoints 170 within a given local access network may vary considerably from that illustrated in FIG. 1. For example, a local access network may contain a single endpoint 170, or may contain many more, with no upper limit to the number of endpoints within a single local access network. In FIG. 1, each local access network is shown connected to a single point of presence. In actuality, a single local access network may connect to more than one point of presence. The connection of multiple points of presence to a single local access network can be a beneficial redundancy used to avoid network failure. Likewise, a single point of presence may serve more than one local access network. One example of a network in accordance with the present invention is a network with at least one thousand endpoints connected to at least ten local access networks through at least thirty-five points of presence that directly connect to at least thirty-five optical nodes. While the invention may be implemented on a smaller scale, as the scale of network increases the advantages of the present invention, such as network stability, increase as well.

FIG. 1 illustrates connections between the various points of presence and optical nodes via telecommunications rings. Telecommunication rings were illustrated in FIG. 1 because their use is common in the industry, but it should not be assumed that this is the only means of connecting a point of presence to an optical node in accordance with the present invention. For example, the connection between a point of presence and an optical node may be routed directly through another telecommunications network, or may be made using a fiber configuration other than a ring, such as a linear fiber connection or a more complex multi-directional connection. A point of presence may also connect to more than one optical node. One telecommunications ring may connect to multiple optical nodes, and a single point of presence may likewise connect to multiple telecommunications rings or other connection facilities. Furthermore, FIG. 1 is a schematic, not a geographical, illustration of a system in accordance with the present invention. The position of elements on FIG. 1 relates to that element's function within the overall network 100, not to its geographical position relative to other elements.

Figure 2:
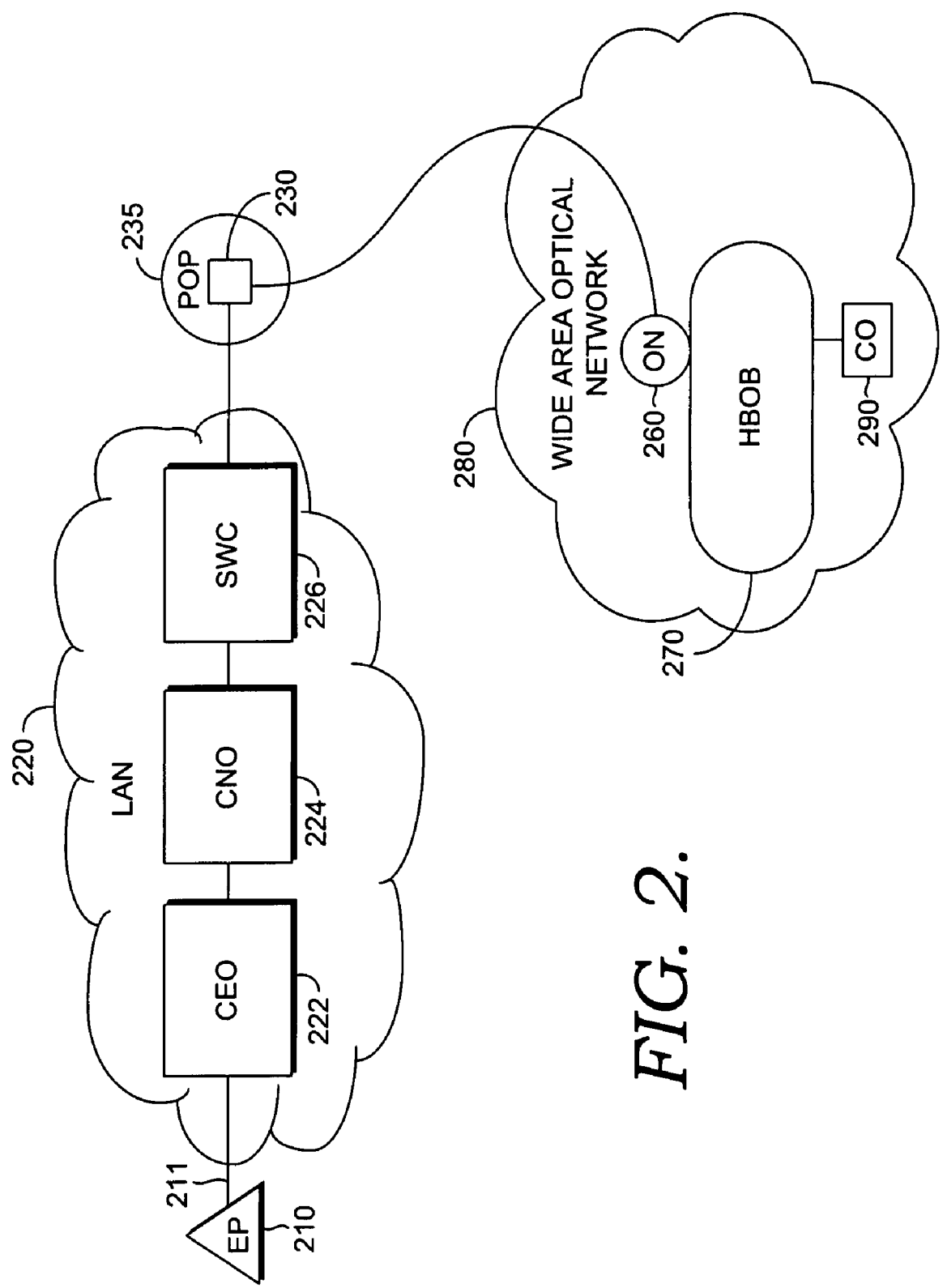
FIG. 2 illustrates the routing of a connection through a local access network and to an optical mode in accordance with the present invention.

Referring now to FIG. 2, a connection between an endpoint and the wide area optical network is illustrated in greater detail for a single endpoint 210. Endpoint 210 connects to the local access network 220 via a connection 211. In practice, connection 211 can be a T1 line with a typical bandwidth of approximately 128 Kb per second. However, other connections may be used in accordance with the present invention. In some implementations, a higher bandwidth connection to the endpoint may be desirable, and as the telecommunication industry advances such higher bandwidth connections will likely be increasingly feasible. Local access network 220 may include local exchange carrier end office 222, a local exchange carrier network office 224 and a serving wire center 226. While the components of the local access network 220 illustrated in FIG. 2 are typical, they are not illustrative of every possible configuration of a local access network 220. Local access network 220 is the network used by a local exchange carrier, familiar to many individuals as their local telephone company, to provide telecommunications in a local area and to provide access to external telecommunication networks. Accordingly, a local access network 220 may be configured in differing ways by different companies in different locations. Signals to and from the endpoint 210 are directed to a point of presence through the local access network 220. Point of presence 230 includes a router 235. Router 235 routes the connection with endpoint 210 directly to optical node 260. The use of router 235 to route the connection with endpoint 210 directly to optical node 260 allows for the omission of the intermediate network between point of presence 230 and optical node 260 that would limit bandwidth available to endpoint 211 and present additional components and elements that could malfunction or otherwise threaten network stability. The connection between point of presence 230 and optical node 260 may be established over any telecommunications connection media. Optical node 260 allows the endpoint 210 to access the wide area network 280. The wide area optical network 280 comprises a high bandwidth optical backbone 270. The possible nature of the high bandwidth optical backbone 270 has been discussed above, and may include fiber optic cable rings extending over wide geographical areas, such as the continental United States. A central office 290 connects to the high bandwidth optical backbone 270. Central office 290 may maintain information to be accessed by endpoints such as endpoint 210, and may be the source of value added services and software updates. Multiple central offices 290 may be employed.

Figure 3:
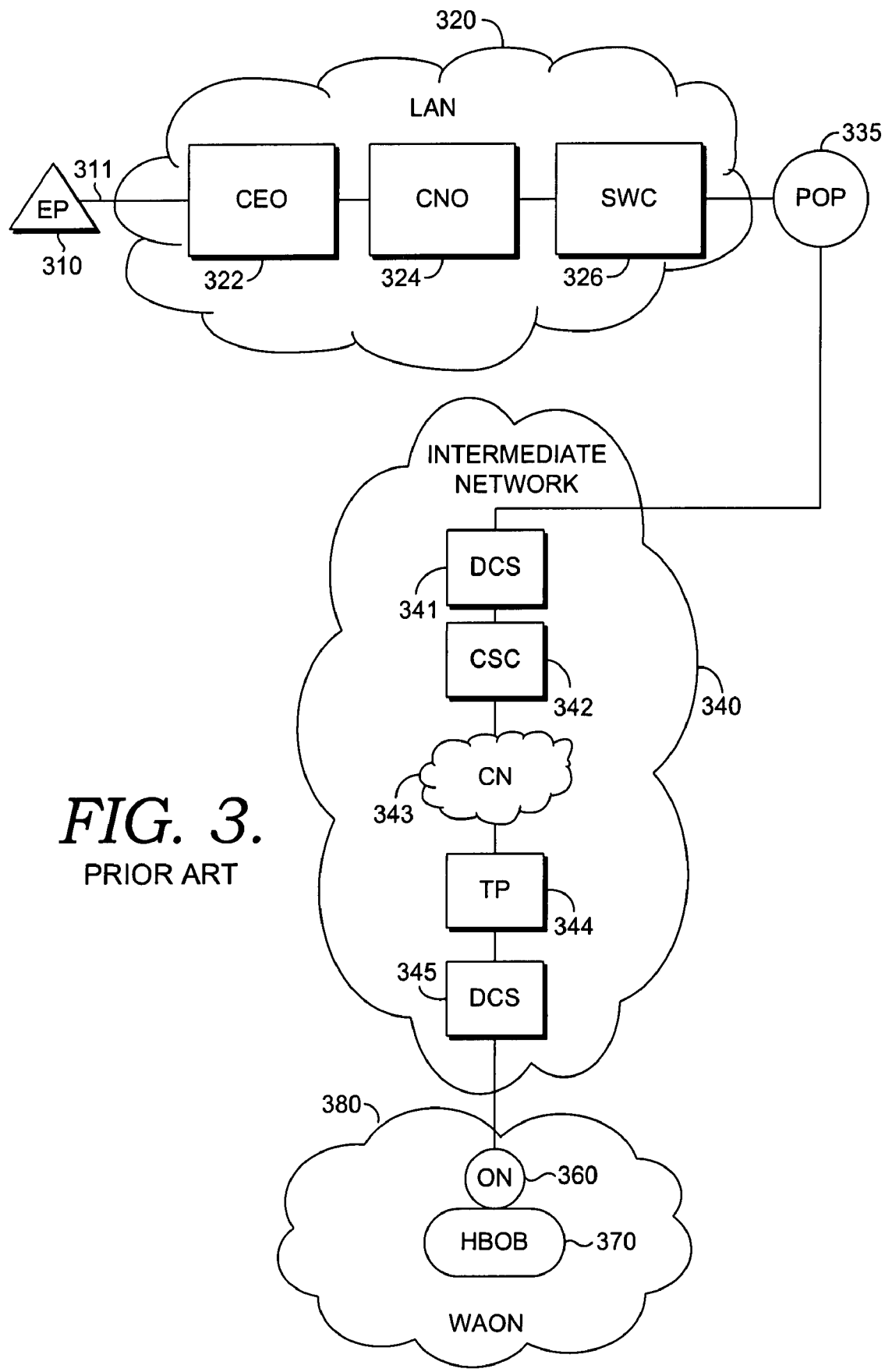
FIG. 3 illustrates the routing of a connection through a local access network and an intermediate network to an optical node in accordance with the prior art.

Referring now to FIG. 3, one example of a prior art connection between an endpoint 310 and a wide area optical network 380 including a high bandwidth optical backbone 370 is illustrated. Endpoint 310 connects to a local access network 320 via a connection 311. Connection 311 may be any form of telecommunications connection, but has most commonly been a T1 connection. Local access network 320 includes a local exchange carrier end office 322, a local exchange carrier network office 324, and a serving wire center 326. For reasons stated with regard to FIG. 2 regarding local access networks in general, the components of local access network 320 illustrated in FIG. 3 are illustrative only, and do not necessarily depict the actual configuration of a specific local access network. The endpoint 310 connects to a point of presence 330 through the local access network 320. Unlike the present invention as illustrated in FIG. 2, in accordance with the prior art the point of presence 330 may connect the signal with the endpoint 310 to an intermediate network 340, sometimes referred to in the art as a transport layer or an IXE transport service. The intermediate network 340 may take a variety of forms and configurations. As illustrated in FIG. 3, one possible configuration includes a digital cross-connect system 341 and a central switch station 342. The intermediate network layer 340 also includes a termination point 344 and a second digital cross-connect system 345. Between the central switch location 342 and the termination point 344 is a communications network 343. The communications network 343 in accordance with the prior art may be a frame relay network, or a network using another network communication protocol. The signal from the endpoint 310 connects to the optical node 360 only after passage through the intermediate network 340. Intermediate network 340 has typically represented both a source of network instability and a bottleneck of data flow to and from endpoint 310. The bottleneck of intermediate network 340 typically arises from the presence communications network 343. For example, if a frame relay network is used for communications network 343, access to frame relay networks are typically available in bandwidth increments considerably less than the 128 kilobyte-per-second bandwidth of a T1 connection. Thus, in accordance with the prior art the use of an intermediate network layer 340 has limited the bandwidth available to endpoint 310, even when endpoint 310 has a connection 311 capable of higher bandwidth carriage, due to the limitations of the communications network 343 in intermediate network layer 340.

Figure 4:
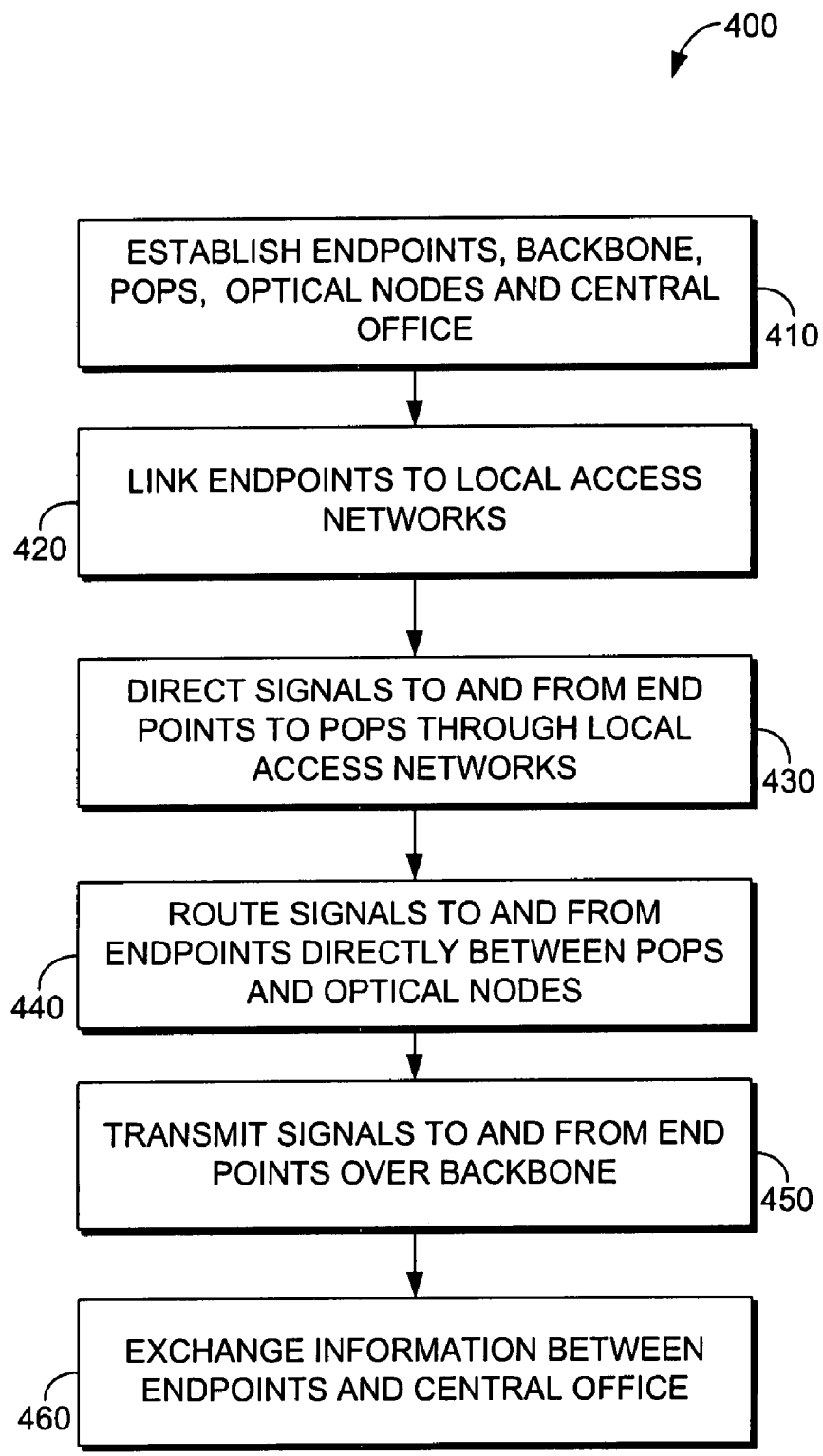
FIG. 4 illustrates a method of establishing a connection between a large number of endpoints and a high bandwidth optical backbone in accordance with the present invention.

Referring now to FIG. 4, a method 400 in accordance with the present invention for networking a large number of endpoints over a high bandwidth optical backbone is illustrated. In step 410 the endpoints, high bandwidth optical backbone, points of presence, optical nodes, and central office are established. It should be noted that step 410 will typically be accomplished in a variety of substeps, and each substep may occur over a substantial period of time. Furthermore, step 410 may constitute a continuing and ongoing process, such as the ongoing addition of endpoints to a network and the construction, expansion and upgrade of endpoints, points of presence, optical nodes, and the high bandwidth optical backbone. Many enterprises seeking to implement the present invention will have completed step 410 as part of establishing an earlier network. In step 420, the endpoints are linked to their respective local access networks. Once again, step 420 may be performed over an extended period of time, as additional endpoints are installed or upgraded. The endpoints may be linked to the local access network using a standard T1 line, but other connections, such as various high bandwidth connections or wireless connections, may be used. As explained above, multiple endpoints may be linked to a single local access network. In step 430, signals to and from endpoints are directed through the local access network to a point of presence. The precise configuration of the local access networks and the components involved is immaterial to step 430. In step 440 the signals to and from the endpoints are routed directly between the points of presence and the optical nodes. Step 440 may be accomplished by using a router or other signal-directing device at the point of presence. While a signal to and from an endpoint may be routed between a point of presence and any optical node, routing the signal to the optical node nearest that point of presence will often be expeditious. In step 450, signals to and from endpoints are transmitted over the high bandwidth optical backbone. Signals to and from the endpoints enter and exit the high bandwidth optical backbone via the optical nodes. Signals from the endpoints may be aggregated for transmission over the high bandwidth optical backbone at the optical nodes using devices such as aggregation routers, and signals from the high bandwidth optical backbone to the endpoints can likewise be separated for transmission to individual endpoints. In step 460, a central office connects to the high bandwidth optical backbone to exchange information with the endpoints. Step 460 may involve the central office receiving new or revised information from one or more endpoints, may involve endpoints requesting specific information and the central office returning the information, may involve software updated being transmitted from the central office to the endpoints, or any other exchange of data. The steps in method 400 may be performed in different orders than as shown in FIG. 4, and may be performed simultaneously. Each individual step may be performed in any number of substeps. Some portions of method 400 may be omitted, if desired.

One skilled in the art will realize that portions of method 400 may be implemented using software installed on machine readable media in machine readable code. For example, executable code may be provided at one or more endpoints, points of presence, routers at points of presence, optical nodes, and central offices for performing method 400

Figure 5:
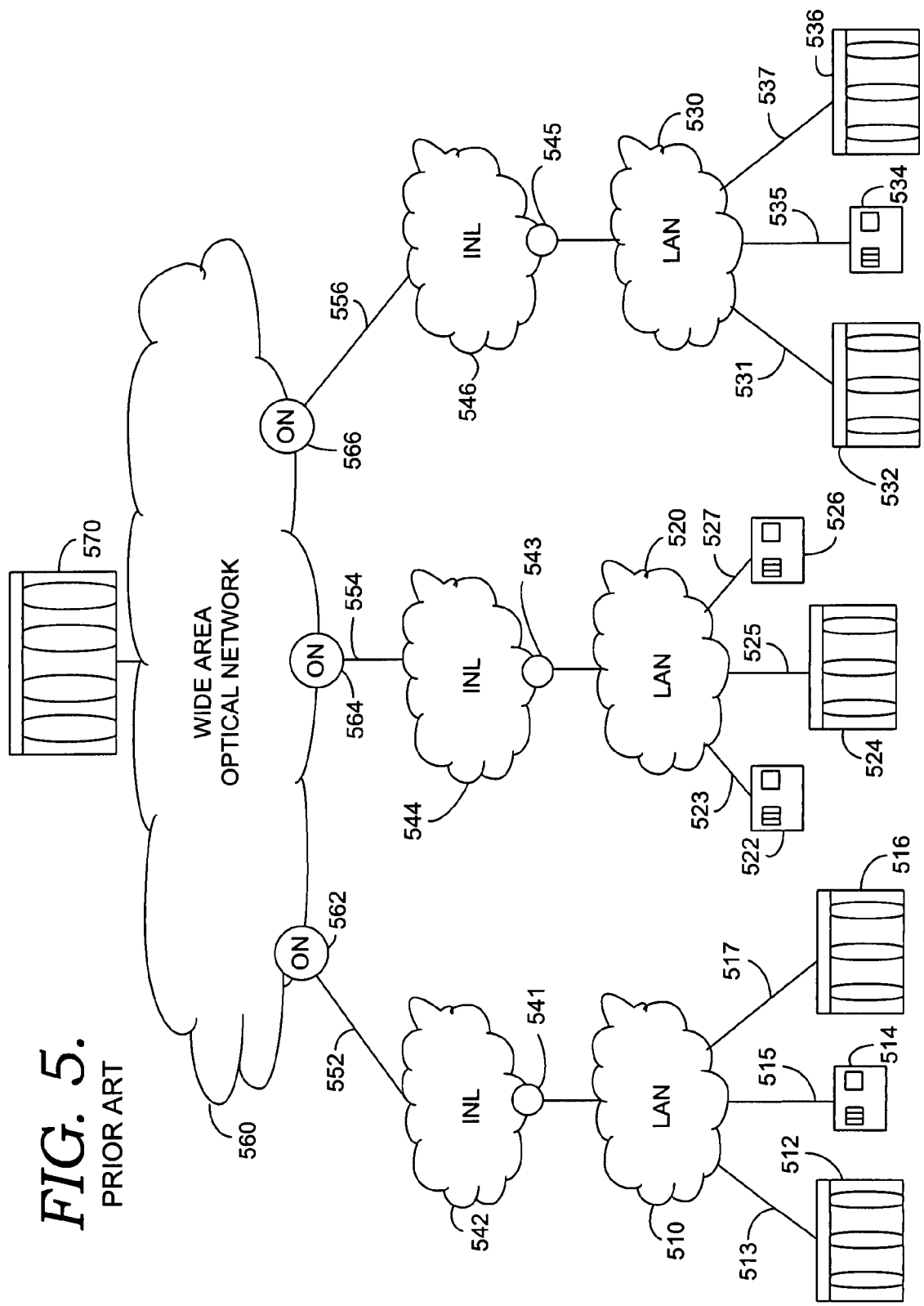
FIG. 5 schematically illustrates a prior art network with particular applications to banking enterprises.

Referring now to FIG. 5, a network in accordance with the prior art is illustrated with particular application to a banking enterprise. A first region may include a first branch office 512 connected to the local access network 510 by connection 513, an ATM 514 connected to local access network 510 by connection 515, and a second branch office 516 connected to local access network 510 by connection 517. The local access network 510 may then connect to a point of presence 541 that thereafter connects to the intermediate network layer 542. Intermediate network layer 542 thereafter connects to optical node 562, which allows the endpoints, in this case branch office 512, ATM 514, and second branch office 516, to access the wide area optical network 560. A second local region includes a first ATM 522 connected to the local access network 520 by connection 523, a branch office 524 connected to local access network 520 by connection 525, and a second ATM 526 connected to local access network 520 by connection 527. Local access network 520 connects to point of presence 543, which accesses a second intermediate network layer 544. The endpoints, in this case ATM 522, branch office 524, and second ATM 526, access the wide area optical network 560. A third region includes a first branch office 532 connected to local access network 530 by connection 531, an ATM 534 connected to local access network 530 by connection 535, and a second branch office 536 connected to local access network 530 by connection 537. The endpoints, in this case branch office 532, ATM 534, and second branch office 536 connect to the intermediate network layer 546 through point of presence 545, and from there connect to the wide area optical network 560 through optical node 566. Wide area optical network 560 connects to central office 570. It should be appreciate that FIG. 5 illustrates a simplified network 500. FIG. 5 illustrates only a first local access network 510, a second local access network 520, and a third local access network 530 with a first intermediate network layer 542, a second intermediate network layer 544 and a third intermediate network layer 546. Further, FIG. 5 illustrates only three endpoints of varying types within each local access network. In actuality, vastly more local access networks may be included in a network for a typical nationwide banking endeavor. Each local access network could connect to varying numbers of endpoints, potentially hundreds or more. Each local access network would, in turn, access an intermediate network layer. Each local access network and each intermediate network would face different constraints and involve different physical configurations and limitations. Each might also employ different software and telecommunications networking protocols. This serves to illustrate the advantages of the present invention. The intermediate network layers, only three of which are illustrated in FIG. 5, drastically increase the complexity of such a network with a high number of endpoints. Furthermore, the inclusion and use of an intermediate network layers serve to restrict the bandwidth available to the endpoints, as discussed above with regard to FIG. 3.

Figure 6:
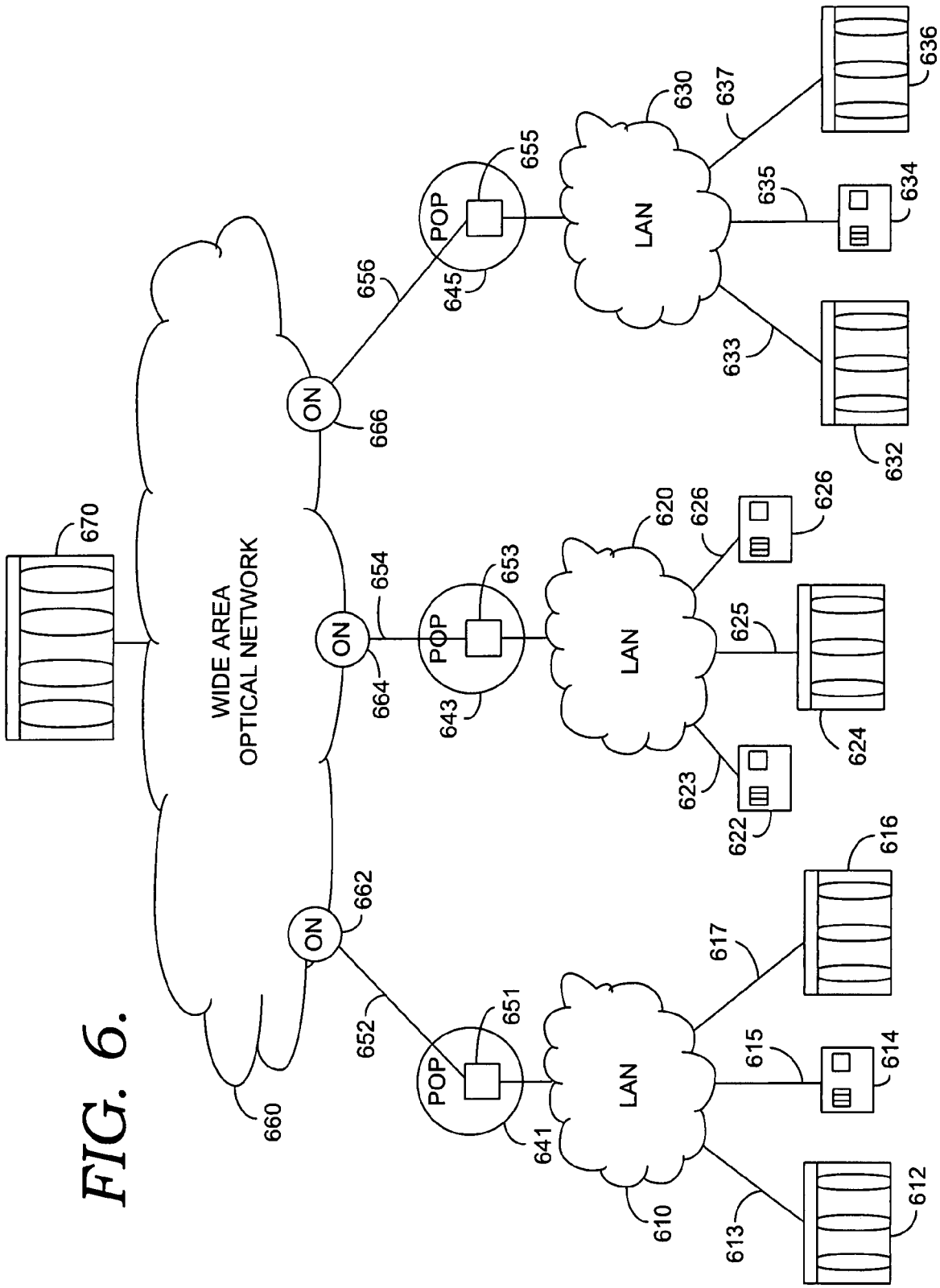
FIG. 6 schematically illustrates a network in accordance with the present invention with particular application to banking enterprises.

Referring now to FIG. 6, a network with a large number of endpoints in accordance with the present invention is illustrated for particular use in application in a banking enterprise. A first region includes a branch office 612 connected to local access network 610 by connection 613, an ATM 614 connected to local access network 610 via connection 615, and a second branch office 616 connected to local access network 610 by connection 617. Local access network 610 connects to point of presence 641. Point of presence 641 includes a router 651 that directly routes the signal with the endpoints, in this case branch office 612, ATM 614, and second branch office 616, directly to optical node 662. Optical node 662 permits signals to and from endpoints to access the wide area optical network 660. A second region includes an ATM 622 connected to local access network 620 by connection 623, branch office 624 connected to local access network 620 by connection 625, and a second ATM 626 connected to local access network 620 by connection 626. The second local access network 620 connects to a second point of presence 643. The second point of presence 643 includes a router 653 that directly routes signals to and from the endpoints, in this case ATM 622, branch office 624, and second ATM 626, directly to optical node 664. Through optical node 664, signals to and from the endpoints access the wide area optical network 660. A third region includes a branch office 632 connected to local access network 630 by connection 633, an ATM 634 connected to local access network 630 by connection 635, and a second branch office 636 connected to local access network 630 by connection 637. Local access network 630 connects to point of presence 645. Point of presence 645 includes router 655. Router 655 directly routes signals to and from the endpoints, in this case branch office 632, ATM 634, and second branch office 636, directly to optical node 666. Signals to and from the endpoints can access the wide area optical network 660 through optical node 666. Wide area optical network 660 connects to central office 670.

One skilled in the art will realize that once signals have been delivered to the high bandwidth optical backbone, those signals must be transmitted in an appropriate digital format. Frame relay, internet protocol, and asynchronous transfer mode are three examples of acceptable communications protocols for use over the high bandwidth optical backbone. However, other communications protocols, both now existing and later to be developed, may be used in conjunction with the present invention.

It should be realized that the present invention can be applied in a variety of enterprise settings. It has been particularly illustrated for use in a banking enterprise, but can be applied to any enterprise with a large number of endpoints requiring networking. This may include, for example, letter and package delivery services, governmental offices, gas stations, and retail stores.

What is claimed is:

1. A method for networking a plurality of endpoints within a plurality of local access networks, the method comprising:
    establishing a plurality of local access networks;
    establishing a plurality of endpoints, each endpoint directly connected to a local access network, the plurality of endpoints comprising at least one branch office of a banking enterprise and at least one automatic teller machine of the banking enterprise;
    establishing a plurality of points of presence, at least one point of presence from the plurality of points of presence directly connected to each of the plurality of local access networks, each of the plurality of points of presence directly connected to the local access networks with no additional network between the local access network and the point of presence;

establishing a plurality of optical nodes, at least one optical node of the plurality of optical nodes directly connected to at least one point of presence of the plurality of points of presence;

establishing a high bandwidth optical backbone connected to at least a first optical node of the plurality of optical nodes, with no additional network between the first optical node and the high bandwidth optical backbone;

establishing a central office connected to at least a second optical node of the plurality of optical nodes, wherein the second optical node is connected to the high bandwidth optical backbone, with no additional network between the high bandwidth optical backbone and the second optical node and with no additional network between the second optical node and the central office;

at the central office, formatting a signal for transmission;

transmitting the signal from the central office, through the second optical node, through the high bandwidth optical backbone, through the first optical node to at least one point of presence of the plurality of points of presence;

routing the signal from the at least one point of presence over a local access network to at least one endpoint of the plurality of endpoints; and receiving the signal at the endpoint.

2. The method of claim 1, wherein the signal transmitted comprises a software update.

3. The method of claim 1, wherein formatting the signal at an endpoint comprises formatting the signal for transmission using internet protocols.

4. The method of claim 1, wherein formatting the signal at an endpoint comprises formatting the signal for transmission using frame relay.

5. The method of claim 1, wherein formatting the signal at an endpoint comprises formatting the signal for transmission using asynchronous transfer mode.

* * * * *